March 4, 1941. J. SCACCHETTI 2,233,901
SYSTEM OF ADAPTABLE ELEMENTS FOR TEMPORARY OR
PERMANENT STRUCTURAL FRAMING
Filed Sept. 12, 1939 6 Sheets-Sheet 4
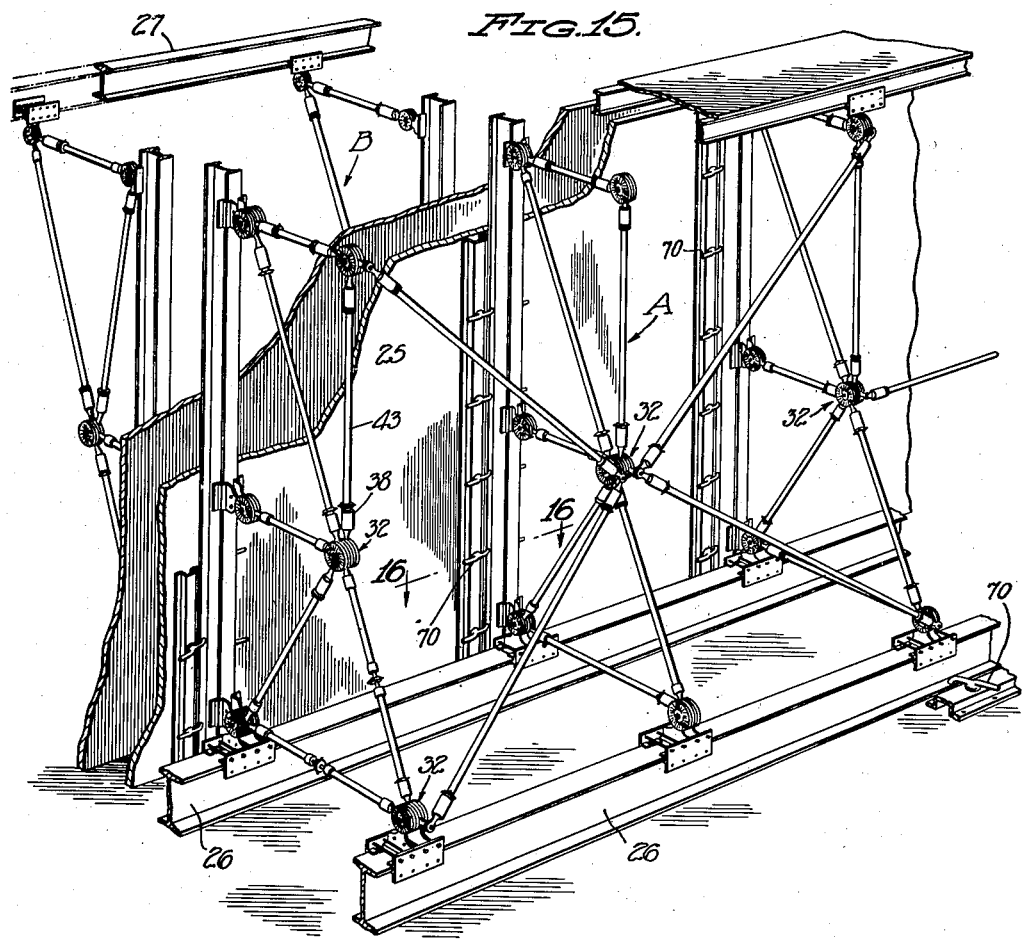
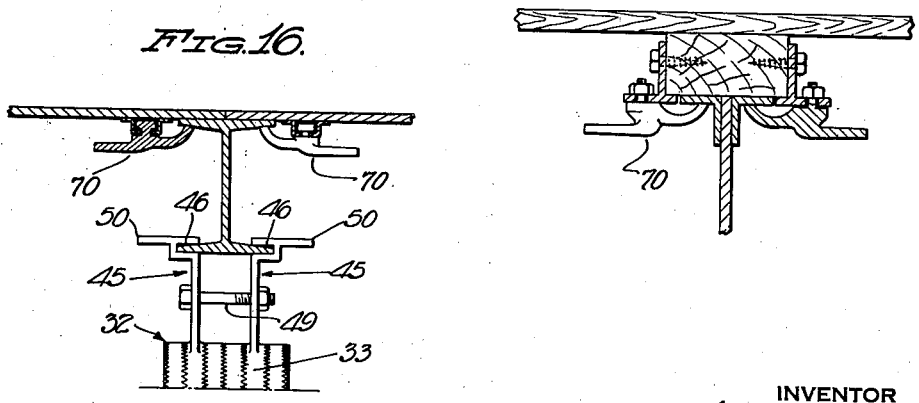
INVENTOR
John Scacchetti
BY
ATTORNEYS March 4, 1941.   J. SCACCHETTI   2,233,901
SYSTEM OF ADAPTABLE ELEMENTS FOR TEMPORARY OR PERMANENT STRUCTURAL FRAMING
Filed Sept. 12, 1939   6 Sheets-Sheet 5
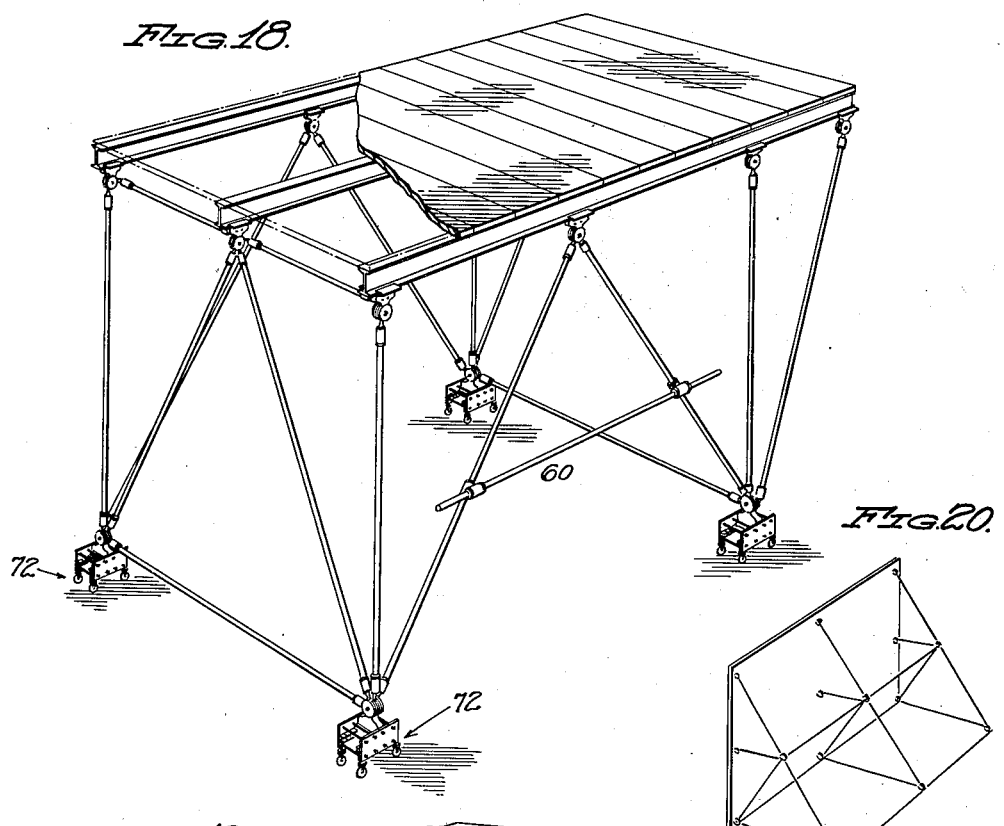
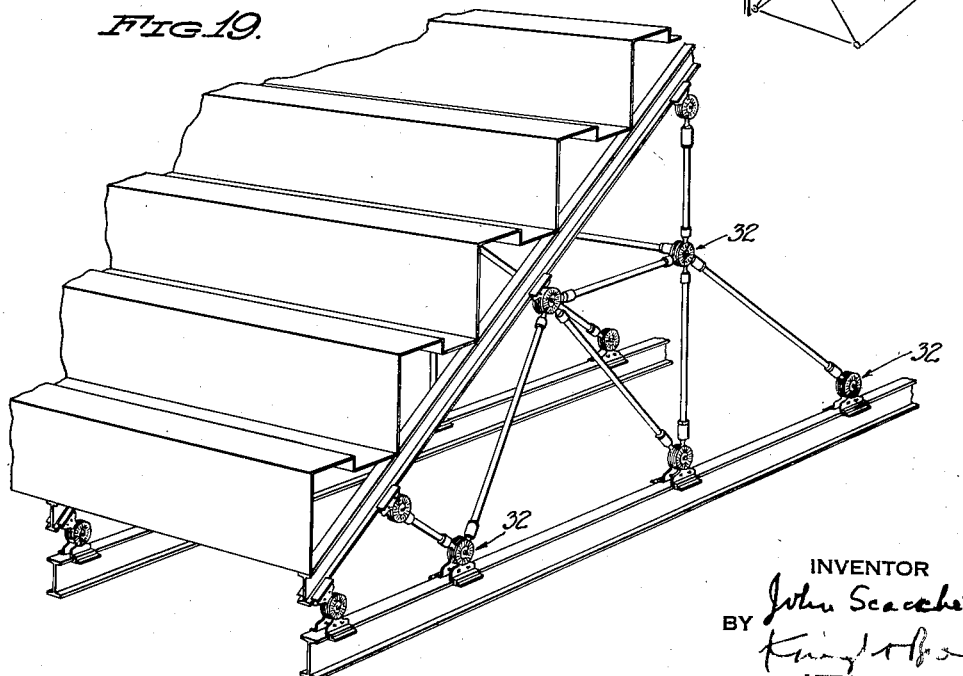
INVENTOR
BY John Scacchetti
ATTORNEYS March 4, 1941.  J. SCACCHETTI  2,233,901
SYSTEM OF ADAPTABLE ELEMENTS FOR TEMPORARY OR
PERMANENT STRUCTURAL FRAMING
Filed Sept. 12, 1939   6 Sheets-Sheet 6

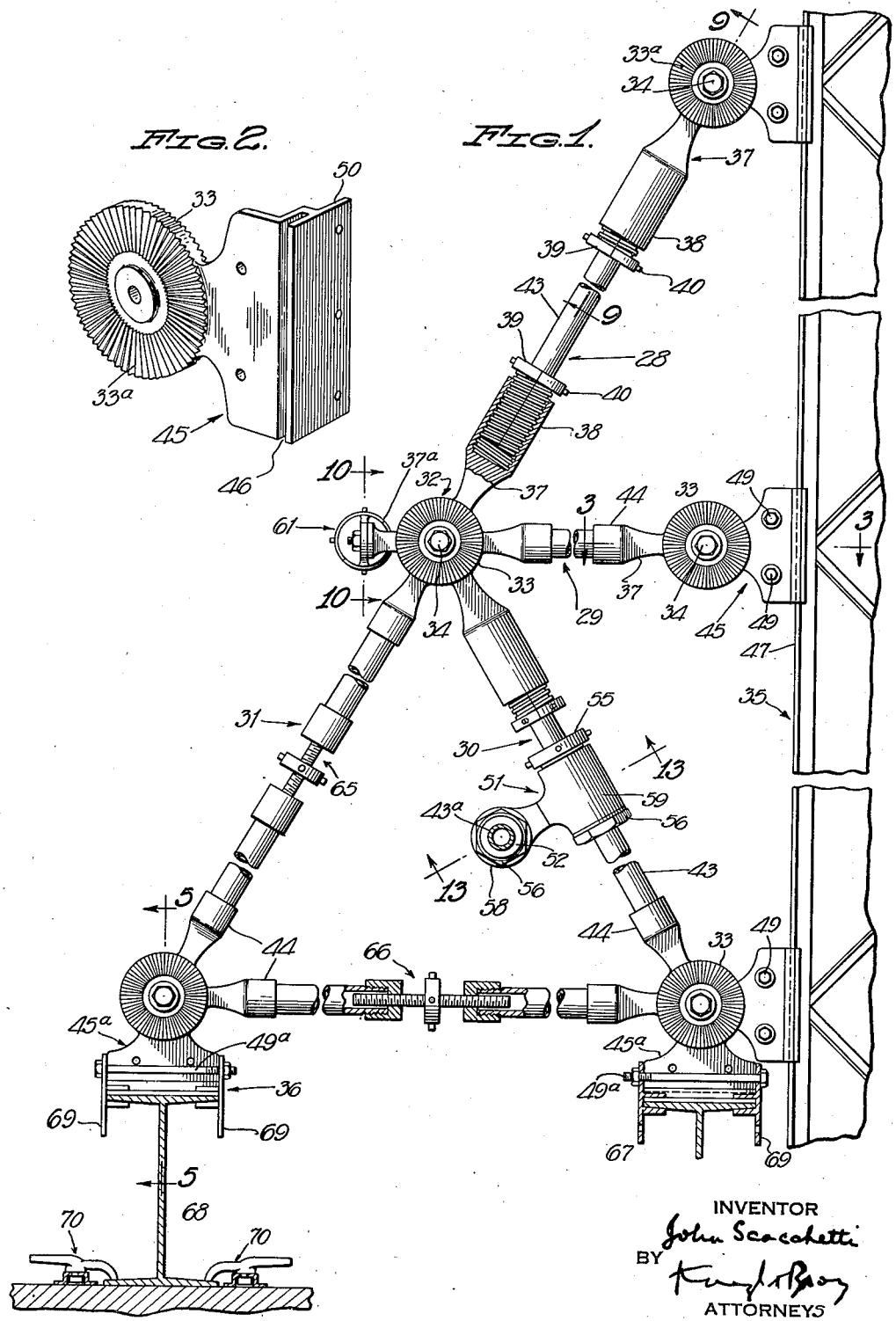

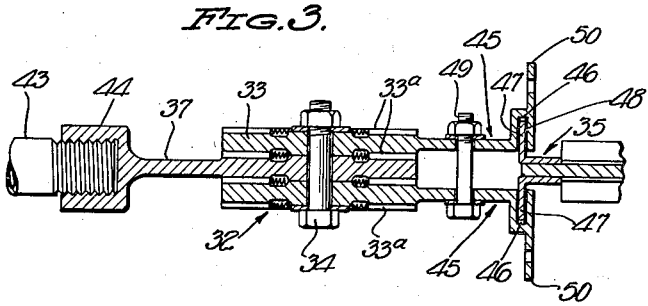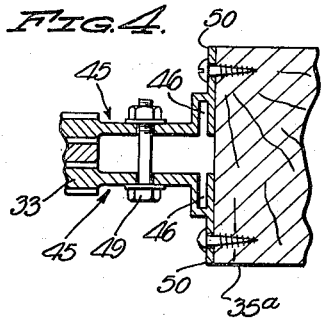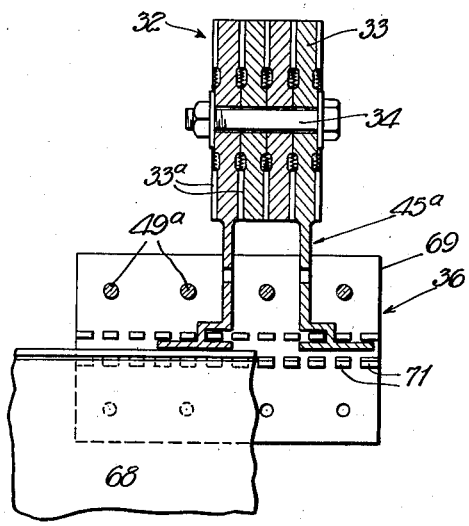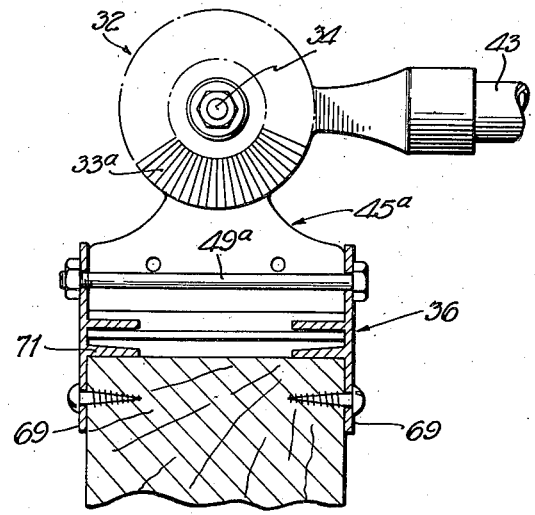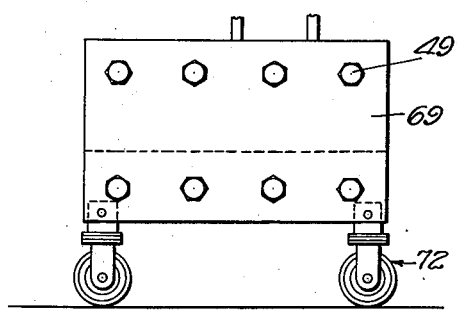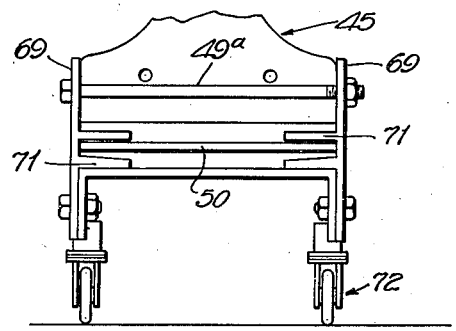

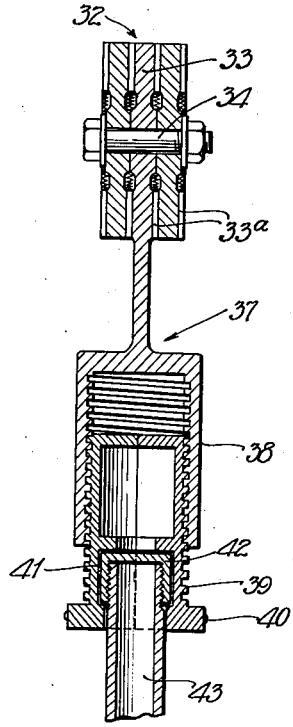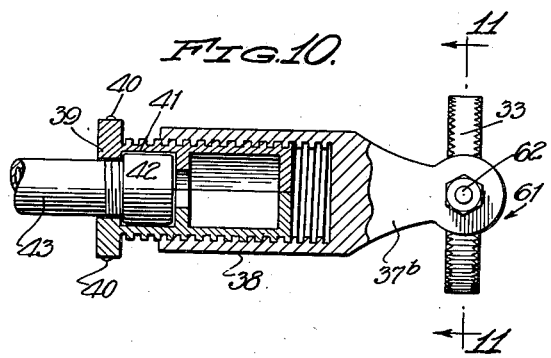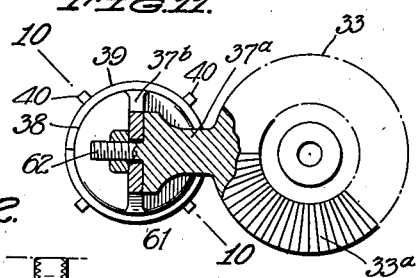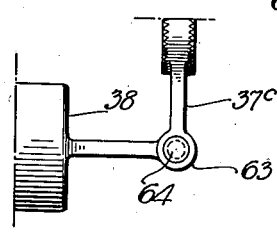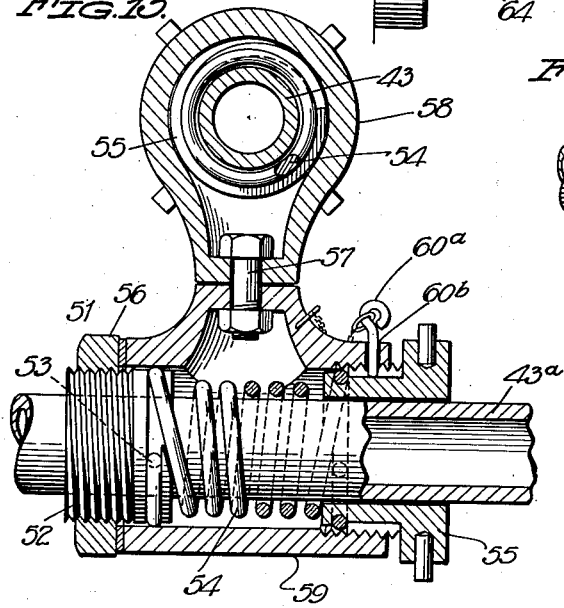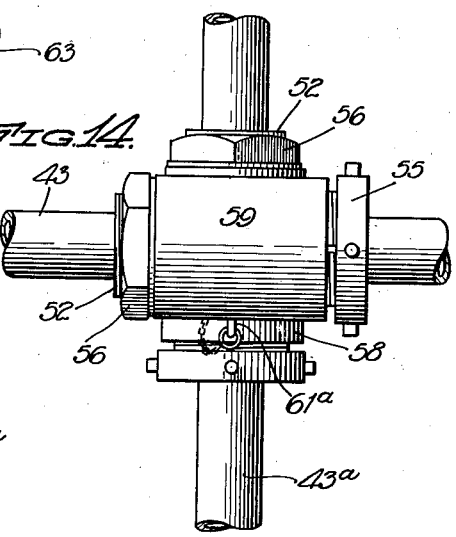

INVENTOR
John Scacchetti
BY
ATTORNEYS

Patented Mar. 4, 1941

2,233,901

UNITED STATES PATENT OFFICE 2,233,901

SYSTEM OF ADAPTABLE ELEMENTS FOR TEMPORARY OR PERMANENT STRUCTURAL FRAMING

John Scacchetti, Union City, N. J.

Application September 12, 1939, Serial No. 294,450

3 Claims. (Cl. 189—34)

There is an expanding need for an easily assembled and demountable frame for various structural purposes, in the building, manufacturing, trade and amusement fields. Such a frame, especially if for temporary use, should utilize standardized materials to a maximum degree, capable of comparatively simple replacement. So far as possible its parts should be interchangeable, for simplification and to give wide adaptability to location and function and should have a maximum of salvage or reuse value. For economy and to be practical its construction and the methods of assembly and demounting it should be easily understood by unskilled labor, inept in the use of complicated tools and equipment.

Weight is another factor to be considered. A trussed frame with secure joints has advantages in this respect over other forms of construction. Heretofore, braced frames of wood have been made far heavier than necessary, simply because of weakness of the joints; the excess material having been provided in order to secure adequate nailing area. The flexibility afforded by wood frames due to the easy cutting and nailing quality, is more than offset by its high salvage loss. The construction of a single swimming pool, even of moderate size, requires thousands of board feet of lumber for which there is no salvage value other than the possible resale to used material dealers of wood, which, although used but once, is affected by the adherence of cement particles, and is very apt to be warped and fit for nothing but kindling.

My invention therefore, is a form of framing which is adaptable to various uses, which may be quickly assembled and demounted, with minimum waste, and which may be employed in temporary or permanent structures, affording a strong, light truss work for supporting walls, forms, beams or other structural members. The principal element of my improved frame is a truss rod having at one end a face-toothed, preferably round, disk, so formed that any desired number of them may be fastened together at the disk end, and with the rods adjustable and firmly held to such angles to one another as may be useful in constructing a frame of any desired design. In constituting such a system, a group of the truss rods having a common center or radiating point, by reason of the assemblage upon a common axis of their disk shaped ends, are used either in a single group or united to one or more similar groups in the same manner, to form a frame of any desired shape and extent. The truss rods may be of varying strength, weight and length and have means of adjusting their length, and fixtures of various kinds are employed for attaching the rods to structural members to be supported or stiffened, or for interconnecting the several rods of a frame to adapt it to the place and function desired. The invention contemplates such further cooperating detail members as will be described with reference to the accompanying drawings, and then more particularly pointed out in the claims.

In the drawings,

Fig. 1 is a side view, with parts removed, of a typical arrangement of my adaptable truss rods and associated elements, united to constitute a structural frame;

Fig. 2 is a perspective view of a clamping member;

Fig. 3 is a horizontal sectional view in the plane indicated by the line 3—3, Fig. 1, through the junction point of several truss rods and the clamp for connecting certain of them to the flange of a metallic structural member;

Fig. 4 is a similar sectional view of part of the same showing how the clamp is adapted to attachment to a wooden support;

Fig. 5 is a view similar to Fig. 3, but taken on the line 5—5, Fig. 1, showing a special form of anchoring member for a variable number of truss rods;

Fig. 6 is a sectional view, taken at right angles to Fig. 5;

Fig. 7 is a view in elevation illustrating a method of mounting the anchor member upon castors or dollies when the scaffold or other frame is to be movable;

Fig. 8 is a view of the same parts taken at right angles to Fig. 7;

Fig. 9 is a sectional view in a plane indicated by the line 9—9, Fig. 1, illustrating a form of coupling for variating the length of a truss rod;

Fig. 10 is a sectional view taken on the line 10—10, Figs. 1 and 11, illustrating a truss rod having its coupling member pivotally mounted upon its assembly disk;

Fig. 11 is a view in elevation, partly in section, taken in a direction at right angles to Fig. 10;

Fig. 12 is a side view showing another way of pivotally connecting the housing member of a truss rod coupling to its centering or axis disk;

Fig. 13 is a sectional view illustrating the method of connecting two truss rods for resisting transverse strains, the plane of section being indicated by the line 13—13, Fig. 1;

Fig. 14 is a side view of the same;

Fig. 15 shows in perspective a frame illustrating my invention in both standing and suspended types, applied to the supporting or bracing of the forms for pouring of a cement wall or otherwise as a shoring or bracing frame for centering or other structural use;

Fig. 16 is a detail sectional view taken on the line 16—16, Fig. 15;

Fig. 17 is a similar view illustrating the use of wooden instead of metal posts or studding; and Figs. 18 to 23 inclusive illustrate in perspective useful applications of my invention to temporary, semipermanent or permanent frames for various purposes.

Figure 21:
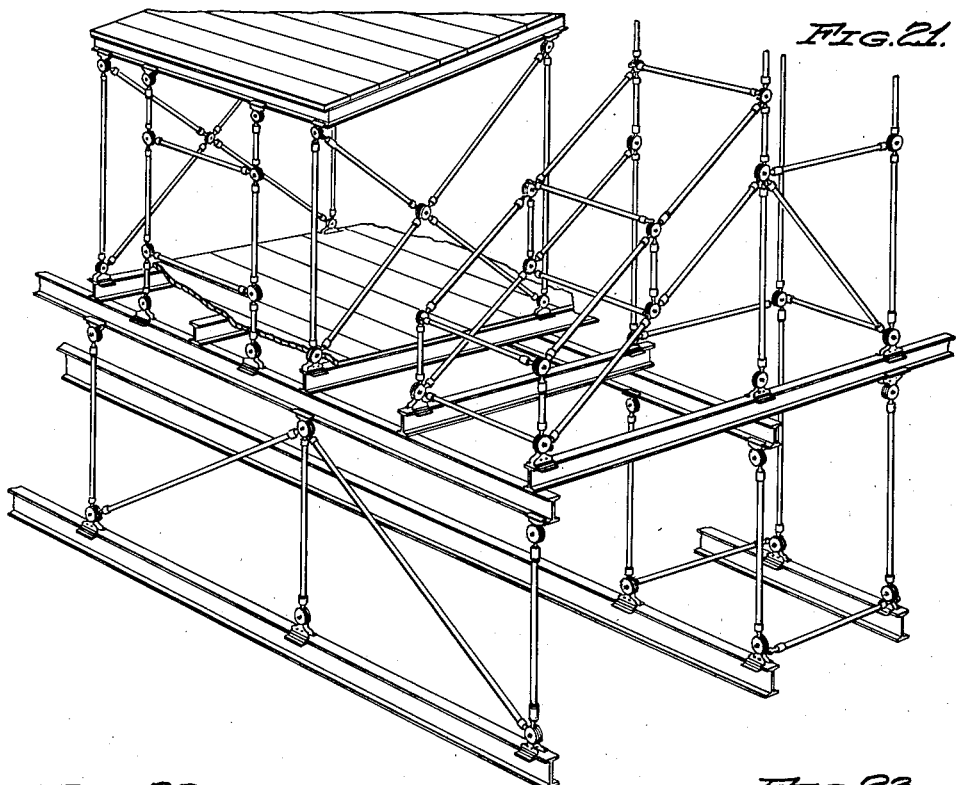

A frame constructed in accordance with my invention may be two or three-dimensional. In Fig. 15 two three-dimensional forms are shown, one, a standing frame A on the hither side of the wall or mold form 25 and supported on the floor girders 26, and another, beyond the wall or mold form, a suspended frame B carried by overhead girder 27. However, in these, as in other forms shown, the three-dimensional frame may be regarded as made up, wholly or partly, of a plurality of two-dimensional frames, such as that exhibited in Fig. 1, with supplemental devices when necessary for solidly supporting it and supporting a form or other structural element from it and for bracing the several two-dimensional frames.

Fig. 1 may be referred to, to obtain an idea of the elements going into a frame such as shown in Fig. 15 and others which will be indicated. The unit of construction is a truss rod which has, at one end, means for coupling it at any desired angle to the like coupling member of another truss, and at the other end means for connecting it to another truss member or to a fixed support, the resulting frame when assembled comprising a series of unions or nodal points whereat a plurality of truss bars unite so as to radiate therefrom at different angles and the radiating members serve to connect the unions with various supporting or extension devices. In Fig. 1, I have shown four truss rods 28, 29, 30, 31, preferably of steel of such strength and stiffness as required for the individual job, varying for example, with the weight to be supported and the height to which the frame is to extend. The rods radiate from a common union 32. At this union, disk shaped ends 33 of the truss rods held together by bolt and nut 34, enable the setting of the several truss rods at angles which will enable them to perform different functions. The rods 28, 29 and 30 for example are so positional that their right hand ends are in a vertical line adjacent to the structural member 35 which they are to support, or by which they are to be supported, while the fourth radial truss rod 31 is connected to an anchoring member 36 remote from the member 35.

In all of these the same method of union is employed. That is, like face-toothed disks, one on each truss member, are brought in contact and united by a bolt at their common axis, and this, whether the union be for uniting a number of truss rods to each other or for uniting one or more truss rods to a structural member. The disks 33 are toothed on both faces at 33a so as to make assembly easy without regard to the order of arrangement of the trusses on the union. The teeth are radial to the common axis of the disks, so that the trusses may be adjusted to the angles required by the individual structure and the teeth take up the torsional effect of the trusses about the union axis, the bolt and nut serving only to hold the disks together. As shown throughout the figures, the surfaces of two disks when laid close together have intimate contact throughout their toothed faces. To assure that each side of every disk will be operable with each side of every other disk, the faces are, as shown particularly in Fig. 2, formed as exact counterparts—each ridge of each disk being an exact counterpart of every groove on both sides of every disk. Thus any number of truss disks may be assembled (Fig. 15 shows from two to six or more) on one connecting bolt—limited only by the length of the bolt. This result cannot be obtained by pressing or stamping a toothed rosette from the body of a truss member, the two sides of such a rosette being necessarily different by reason of the interposition of the thickness of the metal of the bar in which the rosette is stamped. The surfaces of the engaging radial teeth are entire, presenting a continuous frictional surface to the adjacent surface of a disk nesting therewith, so as to make, when bolted together, a substantial, solid structure, well fitted for the strains which a practical scaffolding is called upon to withstand without turning or shifting of one element upon the other, which would endanger the value of the frame as a support for workmen and material.

The truss rod 28 is made up of a disk carrying arm 37 at each end and means extensibly connecting these members, comprising, in this instance (see Fig. 9), interiorly screw threaded socket members 38 in which is seated an exteriorly screw threaded split nut 39 which may be turned by its lugs 40 (see Fig. 1) with a spanner wrench. A chamber 41 within the nut will take, when the split nut is separated, the cap 42 of a pipe or bar 43 whose length is chosen according to the length of the truss rod desired. Smaller adjustments of length can be made by screwing or unscrewing the nut 39.

The truss rod 29 is shown in section in Fig. 3, and the clamp member thereof in Fig. 2. It has a pipe or bar 43 of variable length screwed in cap ends 44 of a disk-ended arm 37 identical with those of rod 28 and ending in face-toothed disks 33 one of which forms part of the union 32 and the other has similar engagement with the toothed disks 33 extending radially from the edge of which are the arms of clamp members 45 of U-shaped cross section, and so having channels 46 engaging the vertical web or flange 47 of the structural post or stud 35, the clamp arm 45, its clutch disk 33 and its means of attachment to the structural member 35 being alike for all the truss rods 28, 29 and 30. Two clamp members 45 engage the opposite sides of the post web or flange and are held by bolts and nuts 49 at any desired position. The inside of the channel 46 may for, say one-third of its depth, be filled with a replaceable lining of soft metal 48 which will tend to provide greater friction when the bolts are drawn tight. For permanent work or where fixed dimensions are predetermined, connection may be made rigid by bolting, welding, riveting, etc. The right hand face of the clamps are widened by the flange 50 to enable its use when a wooden post or stud 35a is employed, in which case the clamp may be attached to the beam by screws as shown in Fig. 4. The channels 46 are in such an arrangement freed from restraint of the flange 47 and permit enough yielding action to allow the toothed disk to be set up tight.

Truss rods 28 and 30 have the same means as truss rod 29 for connecting them to the structural member 35 or 35a. Truss rod 30 has also taken off from it a member 51 illustrated in a number of the figures and shown in detail in Figs. 13 and 14 for providing a truss in a plane normal to that of truss rods 28—31, for lateral bracing or trussing. The main longitudinal member 43 of the truss 30 passes through the spring ring clamp or clutch designated in general by the reference character 51, comprising two like clutch members, pivoted together and mounted adjustably upon separate truss bars 43 and 43a. Each clutch member comprises a screw ring 52 slipped upon the pipe or rod 43 or 43a and shouldered and provided with a hole 53 to receive and hold from rotation one end of a spiral spring 54 whose other end engages a groove and similar hole in nut 55 also slipped on the pipe 43. An abutment ring 56 screws onto ring 52 and the nut 55 engages an internal screw thread in a collar 59. By adjusting the nut 55 the spring 54 is tightened or loosened, thus causing it at will to clutch or release the pipe 43a and optionally attach the collar at any desired point. Swivelled upon the collar 59 by pivot bolt 57 is a collar 58 similar to collar 59 with like clutch arrangement for a cross pipe or rod 43a which serves as a cross truss connected by its toothed disk to form part of a union at a point remote from truss 30. Or, as shown at 60 in Fig. 18, such a cross truss may connect two of the regular unit trusses. Here the value of the adjustability of the two sections of the coupling 51 to any angular relation desired becomes apparent. A lock pin 60a or 61a entering one of a number of holes 60b in the collar 58 or 59 and nut 55, holds the spring clamp in set position. The crossing truss rods 43 and 43a may thus be set and held at any point where they cross.

Another method of connecting members by a transverse truss rod is shown at 61, Figs. 1, 10, and 11, wherein the disk 33 has its arm 37a provided with a pivot pin 62 on which turns the arm 37b of a truss rod which may be connected to other truss rods or to a structural member as already explained.

Another way of connecting to a cross truss is shown in Fig. 12 wherein the disk arm 37c has an eye 63 which engages a pivot lug 64 projecting from a member of a truss rod, as for example, from the socket member 38 of like form to that shown as part of truss rod 28 in Fig. 1.

In Fig. 1, I have also shown at 31 a form of truss rod, the length of which is adjusted by a turnbuckle 65 and a similar adjusting means is shown for the horizontal truss rod 66. Such truss rod connections are sufficient where the member acts particularly as a tension member.

In Fig. 1, I have shown at 67, 68 two I-beams which may serve as foundation or part of foundation for the frame. Side plates 69 are held against the two sides of the clamp plates 45a by bolts 49a. Eccentric cam latch 70 fastened to the foundation which may be wooden plank or cement, engaging the flanges of the I-beam, hold it securely. This construction is also shown in Fig. 6, modified to suit a wooden joist instead of a steel I-beam.

At Fig. 5 means of mounting upon a foundation capable of receiving any number of truss rod disks between the clamp plates is shown. Here the side plates 45 are connected by a grill or comb 71 adapted to enter the channels of the clamp plates.

Figs. 7 and 8 exhibit the mounting of the foundation upon dollies 72, to enable the foundation and frame supported thereby, to be moved about as desired.

Figure 22:
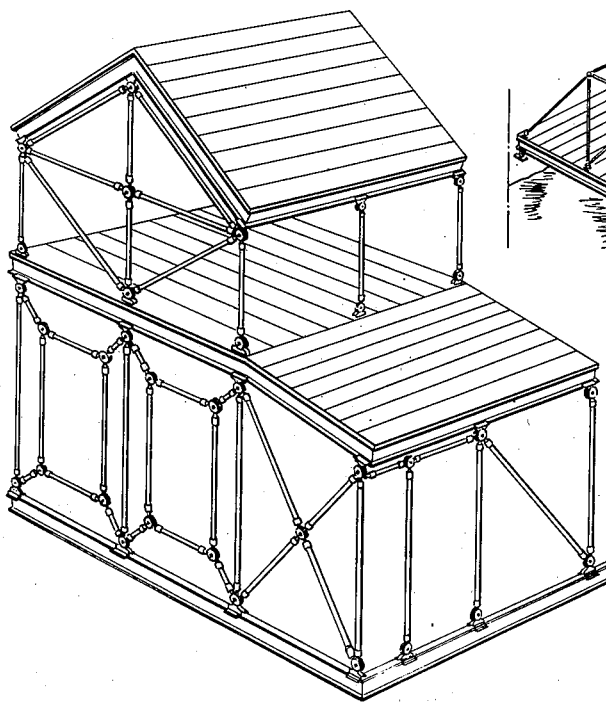
Figure 23:
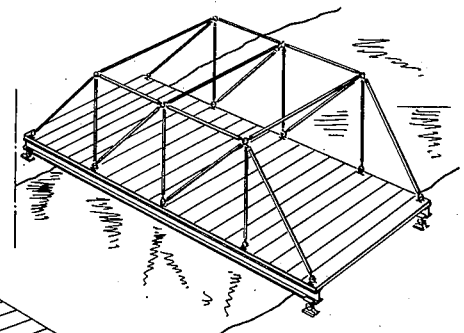

The invention is capable of a great many applications, a few of which are exhibited in the drawings, Fig. 18 showing a permanent or demountable moving or stationary scaffolding, staging, platforming, etc.; Fig. 19, temporary or permanent frames for seating; Fig. 20 a bracing and supporting frame for fences, barricades, boardings, etc.; Fig. 21 protection bridges over walks or drives, temporary sheds, hoist shafts, rubbish or material discharge or delivery chutes; Fig. 22 standardized housing framing, adjustable for height, width or length and for varying window, door and site conditions, frames for temporary or permanent sheds, exhibition booths, shelters, and framing for floor or pitched or flat roof forms; and Fig. 23 temporary or permanent bridges, cat walks, etc. The forms selected being only illustrative of the numerous fields in which the invention will be found useful.

The use of this frame for these or similar constructions of walls, floors, or roofs, together with the standardized form of metal, or the alternate form of wood or other nailable material, would afford the fullest measure of salvage, as none of the joints are disturbed.

The structural quality of the frame also permits its use as a suspended form where clearances must be maintained due to traffic conditions, or where obstructions prevent the use of other types of installation.

Shoring or bracing of walls or banks may be easily accomplished, as the flexibility of the design permits adjustment to any height or pitch from any level.

Platforms used in maintenance work, or by trades where operation from height is necessary may be constructed with this frame and arranged for the necessary clearances below for the passage of traffic or handling of materials.

Temporary structures for seasonal use, such as, gang planks from boat landings or floats, may be built up as required and added to if greater length is desired without waste. The easy demounting permits storing in a minimum area.

Temporary cat walks for spanning construction work are also easily constructed and taken down with complete salvage of all parts.

Military maneuvers involving the use of small, portable, light bridges, require equipment which can be quickly assembled and taken down for rapid transportation.

It is also easily adaptable for use as a foundation for temporary seating in areas of multiple purpose where rapid changes of function are required.

Temporary fencing, canopies, and frames, for sheds, buildings, etc., and billboards used in advertising are other fields in which the frame could be utilized to advantage.

For whatever temporary purpose it is utilized, complete demounting is unnecessary. Loosening at the joints is sufficient to bring the parts in a parallel line.

With slight modification of its structural details as a consequence of reduction in scale the parts may be very easily adapted as an educational toy or game.

From the foregoing description of its various embodiments selected for illustration, it will be seen that the present invention contemplates certain novel features in the construction of prefabricated framing members, a plurality of which, approximately identical in form, may be employed in the building of a two dimensional frame, such for instance as a framing for a scaffold, wall or the like; or a plurality of such frames interconnected; and which said framing members comprise as their essential identifying characteristics, truss rods carrying at their ends coupling discs having flat assembly faces adapting several of such discs to be stacked and held together about an axis of assembly with their several truss rods radiating from said axis, in various directions in a plane of load distribution, or in some instances deflected from said plane as in serving to connect two such frame structures, or as bracing connections therefor; some or all of the truss rods so assambled being composed of at least two strutting members substantially coinciding with the longitudinal axis and carrying the coupling discs of said rods; the strutting members of the truss rods being relatively rotatable about said longitudinal axis to enable the coupling disc or discs of each truss rod to present their stacking faces in parallelism with faces of other discs which they meet in the assembly; means being interposed between the strutting members of each truss rod, such as screw threaded connections, whereby said strutting members may be forcibly moved relatively to each other and the length of the truss rod may be changed; and this changing of length may be attained without rotation of the stacked discs and therefore accomplished after assembly is completed and with the effect of placing each framing member under tension or compression as may be desired in stiffening the frame, distributing load throughout the frame, and justifying the frame structure as may be desired. The designation "truss rod" herein employed refers to a framing member whether it is under tension or compression.

It will also be seen that the invention further contemplates the construction of the assembly faces of the discs with appropriate formation such as radial ribs and grooves which will permit two discs to be placed together at any desired relative angle of rotation about the assembly axis, as for instance in determining the radial positions of the truss rods in the plane of load distribution; also the introduction of flexing joints between certain of the truss rods and their coupling discs in order to permit desired deflection of such truss rods from the plane of load distribution and giving to a bracing or frame connecting truss rod an enlarged range of movement in attaining definite points of anchorage; and particularly permitting shifting of the plane of radius action offered by such a joint to any one of a number of planes determined by the relative rotation of the assembly disc about the stacking axis.

I claim:

1. A structure having truss bars united to form a frame and means for attaching said frame to a foundation or other structure, comprising flanged clamp-plates, side-plates having grills or combs to engage the flanges of the clamp-plates, and means for holding the side-plates against the clamp-plates with the flanges of the clamp-plates in engagement with the grills or combs of the side-plates.

2. In a scaffold or like frame structure, a plurality of framing members comprising truss rods carrying at their ends coupling discs constructed with assembly faces that adapt said discs to be stacked and clamped together in superposed relation at an assembly center in a plane of load distribution of the frame and with the truss rods radiating from their respective stacked discs at said center in selected positions in said plane and in directions appropriate to the frame being formed; each truss rod being composed of at least two strutting members substantially coinciding with the longitudinal axis of the truss rod; the strutting members of each truss rod being relatively rotatable about said longitudinal axis and thereby enabling coupling discs at the ends of the rod to present themselves in parallelism with faces of other discs which they meet in the stack; means being interposed between the strutting members of each truss rod for forcibly imparting relative longitudinal movement to said strutting members and thereby changing the length of the truss rod; and the coupling discs on the strutting members of a truss rod being free to remain in stacked and clamped position during such length adjustment.

3. In a scaffold or like frame structure, a plurality of framing members comprising truss rods carrying at their ends, coupling discs constructed with assembly faces that adapt said discs to be stacked and clamped together in superposed relation at an assembly center in a plane of load distribution of the frame and with the truss rods radiating from their respective stacked discs at said center in selected positions in said plane and in directions appropriate to the frame being formed; at least one of said truss rods having hinging connection with its disc in the stack that permits deflection of such hinged truss rod at a substantial angle to said plane of distribution and leaves it free to swing in a plane perpendicular to said plane in reaching a point of anchorage outside of said plane; each truss rod being comprosed of at least two strutting members substantially coinciding with the longitudinal axis of the truss rod; the strutting members of each truss rod being relatively rotatable about said longitudinal axis and thereby enabling coupling discs at the ends of the rod to present themselves in parallelism with faces of other discs which they meet in the stack; rotational means being interposed between the strutting members of each truss rod for forcibly imparting relative longitudinal movement to said strutting members and thereby changing the length of the truss rod; and the coupling discs on the strutting members of a truss rod being free from partaking of rotation of the length adjusting means and thereby permitting the length adjustment to take place after the coupling discs are assembled.

JOHN SCACCHETTI.